July 29, 1941.  T. L. SHERMAN  2,250,607
PIVOTED BEARING ELEMENT OR SLIPPER PAD FOR CRANKLESS MECHANISMS
Filed May 27, 1939
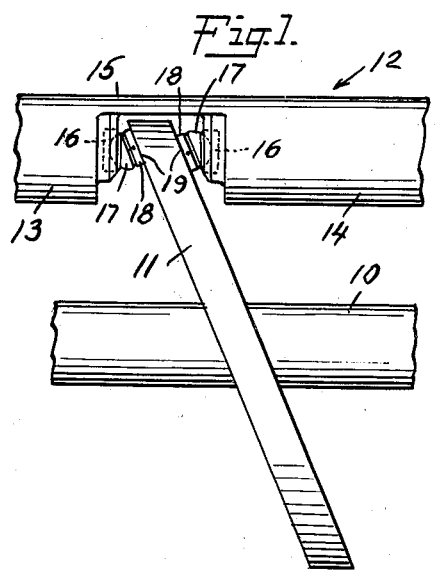
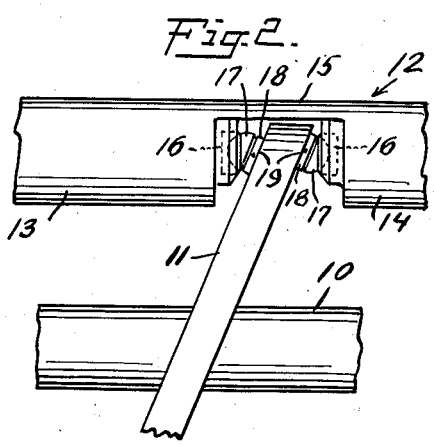
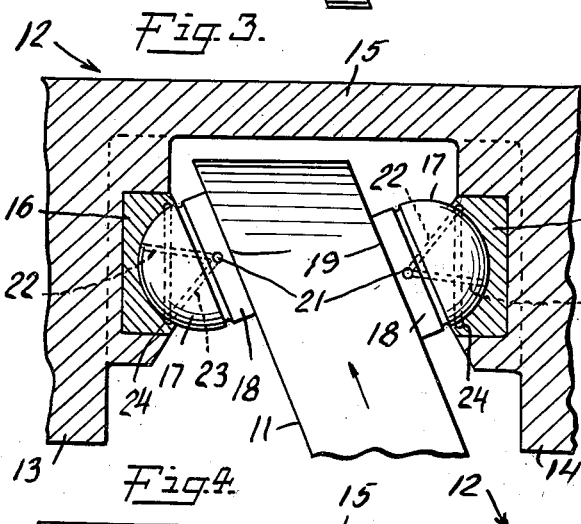
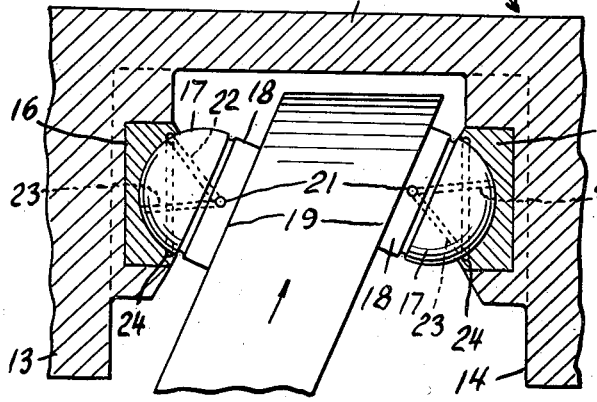
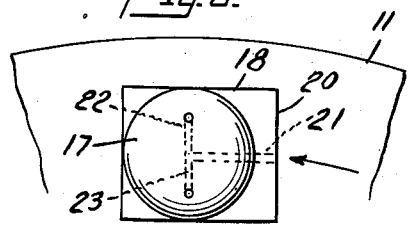
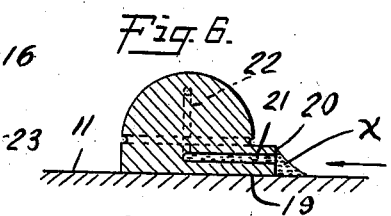
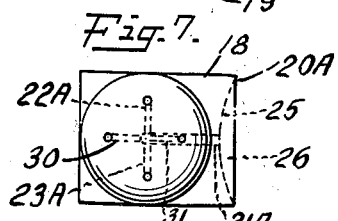
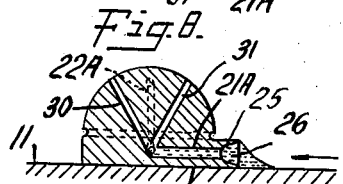
INVENTOR
Thomas L. Sherman
BY
Marshall & Hawley,
ATTORNEYS Patented July 29, 1941

2,250,607

UNITED STATES PATENT OFFICE 2,250,607

PIVOTED BEARING ELEMENT OR SLIPPER PAD FOR CRANKLESS MECHANISMS

Thomas L. Sherman, New York, N. Y.

Application May 27, 1939, Serial No. 276,134

3 Claims. (Cl. 308—5)

This invention relates to pivoted bearing elements or slipper pads for crankless mechanisms.

More particularly stated, the invention relates to means for lubricating the pivot joints of slipper bearings or pads.

In one type of crankless mechanisms the reciprocating units or pistons transmit their reciprocating motion to a shaft through a slant which is mounted on the shaft and slipper pads or bearing members which are pivoted for universal movement in the reciprocating unit and which have plane bearing surfaces engaging the faces of the slant. The bearings between the plane surfaces and slant are lubricated by a film of oil sprayed or jetted onto the latter. It is difficult, however, to lubricate the pivotal bearing of the pad or bearing element and in some engines of this type very high pressures are exerted on the pivotal bearings.

This invention has for its salient object to provide simple and practical means for conducting lubricant to the pivotal bearings of slipper pads or like bearing elements.

Another object of the invention is to provide means in a slipper pad for conducting lubricant from the leading edge of the pad to the spherical or pivotal bearing of the pad.

Another object of the invention is to provide means whereby lubricant will be distributed around the spherical bearing surface of a slipper pad.

Further objects of the invention will appear from the following specification taken in connection with the drawing which forms a part of this application, and in which Fig. 1 is an elevational view partly broken away showing a shaft, a slant mounted thereon and a reciprocating unit coacting with the slant through slipper pads, the parts being shown in one extreme position of movement of the reciprocating unit;

Fig. 2 is a view similar to Fig. 1 but showing the reciprocating unit in another extreme position of movement;

Fig. 3 is a sectional elevation on an enlarged scale of the portion of the slant engaging the slipper pads and the reciprocating unit, this view being taken in the plane of Fig. 1;

Fig. 4 is a view similar to Fig. 3 but showing the slant and other parts in the other extreme position of movement;

Fig. 5 is an elevational view of one of the slipper pads and slants showing one arrangement of conduits or ducts for conducting the lubricating fluid to the spherical portion of the pad;

Fig. 6 is a sectional elevation taken at right angles to Fig. 5; and

Figs. 7 and 8 are views similar to Figs. 5 and 6 but illustrate another arrangement of conduits or ducts for conducting the lubricant to the spherical or pivotal bearing portion of the pad.

The invention briefly described consists of providing a slipper pad or pivoted bearing element with conduits or ducts for conducting lubricant from the leading edge of the slipper pad whereon the lubricant carried by the slant surface abuts. The sudden change in momentum of the oil moving with the slant builds up pressure conditions at the leading edge of the slipper pad which are available for the forcing of oil through the ducts or conduits. The conduits are so disposed that as the slipper pivots in the socket the discharge ends of the ducts will communicate in predetermined positions of the pad and socket with a groove formed in the socket for receiving the oil. By means of this groove the oil is distributed around the entering edge of the socket and is so available for being drawn into the same by the movement of the spherical portion of the pad.

Further details of the invention will appear from the following description.

In Figs. 1 and 2 there is shown a shaft 10, a slant 11 mounted thereon and a reciprocating unit 12 which may consist of one or a pair of oppositely extending pistons 13 and 14 connected by a bridge 15. The bridge or connecting portion 15 has a pair of oppositely facing sockets 16, 16 in which are seated spherical bearing portions 17, 17 of the slipper pads 18. The pads also have plane bearing surfaces 19, 19 which engage the oppositely facing surfaces of the slant 11.

In Fig. 1 the slant and reciprocating unit are shown at one extreme position of movement and in Fig. 2 these same elements are shown at the other extreme position.

In the embodiment of the invention illustrated in Figs. 5 and 6 the lubricant or oil X moving with slant 11 backs up against the leading edge 20 of the slipper pad 18. A conduit 21 communicates with the edge 20 and at its opposite end communicates with a pair of diverging ducts 22 and 23 which extend to the spherical bearing surface 17 of the slipper pad. These ducts 22 and 23, as shown particularly in Fig. 3, are angularly disposed relative to each other and are so located that in one extreme position of movement the duct 22 will communicate with an annular groove 24 of the socket 16 and in the other extreme position of movement the other duct 23 will communicate with this groove.

In the form of the invention illustrated in Figs. 7 and 8 the leading edge 20A of the slipper pad 18 is concaved, as shown at 25, thus forming a pocket 26 for the better collection of oil or lubricant. This pad is provided with a duct or conduit 21A which corresponds to the duct 21 shown in Figs. 5 and 6 and with diverging ducts 22A and 23A similar to the ducts 22 and 23 in the preceding figures. In addition to these diverging ducts the conduit 21A may also communicate with a pair of diverging ducts 30 and 31 which are disposed in a plane at right angles to the plane of the ducts 22A and 23A. Thus, in the form of the invention shown in Figs. 7 and 8 there are four oil discharge conduits which communicate with four different points on the spherical bearing surface 17. In various positions of movement of the slipper pad these conduits communicate at regular intervals with the annular groove 24 in the socket 16 and conduct lubricant thereto.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. A pivoted bearing element having a plane bearing surface provided with leading and trailing edges and having a spherical bearing surface, and means including a plurality of conduits communicating with the leading edge of the element and with the spherical bearing surface for conducting lubricant from said leading edge of the element to said spherical bearing surface.

2. In combination, a reciprocating unit having a socket, a slipper pad having a spherical bearing surface seated in said socket and having a plane bearing surface, a duct communicating with the leading edge of said plane surface, and conduits leading from said duct to the spherical bearing surface of the slipper pad.

3. A slipper pad having a spherical bearing portion and a plane bearing surface, said pad having an oil receiving pocket at the leading edge of the plane bearing portion, and means for conducting oil from said pocket to the spherical bearing surface.

THOMAS L. SHERMAN.